US007352882B2

(12) United States Patent
Wolf (10) Patent No.: US 7,352,882 B2
(45) Date of Patent: Apr. 1, 2008

(54) SYSTEM AND METHOD FOR DETERMINING COMPACTNESS IN IMAGES

(75) Inventor: Matthias Wolf, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 597 days.

(21) Appl. No.: 10/916,808

(22) Filed: Aug. 12, 2004

(65) Prior Publication Data

US 2005/0058349 A1  Mar. 17, 2005

Related U.S. Application Data

(60) Provisional application No. 60/495,306, filed on Aug. 14, 2003.

(51) Int. Cl.
  *G06K 9/00* (2006.01)
(52) U.S. Cl. .................. 382/103; 382/154; 345/419
(58) Field of Classification Search ............. 382/103, 382/128, 129, 130, 131, 132, 133, 154, 168, 382/171, 190, 194, 203, 209–213, 221, 232, 382/237, 260, 274, 275, 276, 285, 305; 378/41, 378/62; 600/425; 345/419
  See application file for complete search history.

(56) References Cited

U.S. PATENT DOCUMENTS

| | | | | |
|---|---|---|---|---|
| 5,987,094 A | * | 11/1999 | Clarke et al. | 378/62 |
| 6,609,021 B1 | * | 8/2003 | Fan et al. | 600/425 |
| 6,678,399 B2 | * | 1/2004 | Doi et al. | 382/131 |
| 6,909,797 B2 | * | 6/2005 | Romsdahl et al. | 382/131 |
| 6,985,612 B2 | * | 1/2006 | Hahn | 382/128 |
| 6,990,228 B1 | * | 1/2006 | Wiles et al. | 382/154 |
| 7,123,762 B2 | * | 10/2006 | Giger et al. | 382/132 |

OTHER PUBLICATIONS

Yamomoto S et al: "Image processing for Computer—aided diagnosis of lung cancer by CT(LSCT)" Proceeding. Third IEEE Workshop on Applications of Computer Vision. WACV'96 (CAT. No. 96TB100084) IEEE Comput. Soc. Press Los Alamitos, CA, USA, 1996, pp. 236-241,XP002304339 ISBN: 0-8186-7620-5 the whole document.

Binsheng Zhao et al: "Automatic detection of small lung nodules on CT' utilizing a local density maximum algorithm" Journal of Applied Clinical Medical Physics, American College of Medical Physics, Melville, NY, US, vol. 4, No. 3, Jul. 2003, pp. 248-260, XP002286573 ISSN: 1526-9914 Section C, figures 4 (A)-(C).

Takizawa H et al: "Recognition of lung nodules from X-ray CT images using 3D Markov random field models" Pattern Recognition, 2002. Proceedings. 16th International Conference on Quebec City, QUE., Canada Aug. 11-15, 2002, Los Alamitos, CA, USA,IEEE Comput. Soc, US, Aug. 11, 2002, pp. 99-102, XP010613284 ISBN: 0-7695-1695-X figures 2,3.

(Continued)

*Primary Examiner*—Seyed Azarian (57) ABSTRACT

An image processing system for recognizing image features in three dimensional images, which can be medical images, uses a mask generator for generating masks that are used by a candidate searcher to search for candidate images in the three dimensional image. The candidate searcher applies the mask to a section of a foreground region of the image to determine the presence of a structure/object by counting the number of intersections between the mask and the section of the foreground region.

15 Claims, 7 Drawing Sheets

OTHER PUBLICATIONS

Armato Samuel G et al: "Automated detection of lung nodules in CT scans: Effect of image reconstruction algorithm" Medical Physics, American Institute of Physics. New York, US, vol. 30, No. 3, Mar. 2003, pp. 461-472, XP012012018 ISSN: 0094-2405 Last two sentences of Section C, figures 7(a)-(d).

Jerebko A K et al: "Polyp segmentation method for CT colonography computer—aided detection" Proceedings of the SPIE—The International Society for Optical Engineering SPIE—Int. Soc. Opt. Eng USA, vol. 5031, 2003, pp. 359-369, XP002304340 ISSN: 0277-786X conference: Mar. 16-18, 2003 figures 6 (a)-(e), 7 (a)-(c) abstract.

Ginneken Van B et al: "Computer—Aided Diagnosis in Chest Radiography: A Survey" IEEE Transactions on Medical Imaging, IEEE Inc. New York, US, vol. 20, No. 12, Dec. 2001, pp. 1228-1241, XP001101452 ISSN: 0278-0062 the whole document.

* cited by examiner

SYSTEM AND METHOD FOR DETERMINING COMPACTNESS IN IMAGES

CROSS-REFERENCE TO RELATED APPLICATION

This application claims the benefit of U.S. Provisional Application No. 60/495,306, filed on Aug. 14, 2003, a copy of which is herein incorporated by reference.

TECHNICAL FIELD

This invention relates to the field of image processing and particularly to the detection of three dimensional objects in binary images or label images.

DISCUSSION OF THE RELATED ART

The field of image processing has progressed beyond the basic functions of capturing images and applying fundamental image transformations to the captured images. In general, processing of two dimensional images is relatively less complex as compared to the processing of three dimensional (3-D) images. The 3-D image recognition is a complex process given that surface, shape and size detection in 3-D images require a processing of a large number of parameters before a 3-D shape can be recognized.

Detection of three dimensional (3-D) objects in volumetric images is a complex task. However, the problem of 3-D recognition is further compounded when the speed of recognition is a paramount concern. For example, a medical imaging device in an emergency room or a busy hospital would require extremely fast analysis of a captured image to enable the physician or surgeon to make rapid medical diagnosis and decisions based on the recognized image.

From an image processing perspective, an ideal 3-D object recognition system would require a thorough testing of each image element, i.e., each voxel (volume element) of the image. However, this would be an impracticable technique, given the sheer amount of voxels present even in a relatively medium size image. Hence, there is a need for a system and fast method that chooses a small number of voxels to be tested thoroughly in later processing steps by using an optimized criteria.

Medical image processing is an important type of image processing application. In medical image analysis the emphasis is on recognizing medically significant target objects like tumors, cysts, etc. Typically, the objects to be detected have a relatively small volume. For example, detecting lung nodules automatically in a CT (Computed Tomography Scan) lung scans is a difficult process. However, early diagnosis of lung nodules can help in detecting and treating lung cancer. It is desirable that a computer aided nodule detection system should be fast, have high sensitivity and high specificity.

Existing approaches often use geometrical features of image objects such as sphericity and curvature to identity nodules. However, calculation of such features is computationally time consuming. Typically, the time constraints of the medical diagnosis process render the thorough testing of each voxel of a 3-D medical image to be an inefficient technique. Hence, there is a need for a fast algorithm applied by a system for medical image processing to detect specific structures and/or objects in images.

SUMMARY

A system of detecting structures/objects in three dimensional images operates on three dimensional volumetric images. The image is segmented into foreground and background regions, where foreground region is the region of interest. A mask generator generates three dimensional masks. A candidate searcher, also called candidate generator, searcher for possible structures/objects within the three-dimensional image that are similar to the object to searched. The candidate searcher applies the masks on a selection of the foreground regions to determine the presence of the searched structure/object in the image. Each identified structure/object is called a candidate.

An intersection technique is applied to determine the presence of the candidates in the three dimensional image. The mask is applied to a section of the foreground region. The number of intersections between the mask and the section of the foreground region are counted. The presence of a candidate can be inferred if there is zero or only one intersection. This indicates that the nodule is either fully covered by the mask or else is attached to a wall or vessel. However, if the intersections are more than one then the image section is not a candidate.

In an embodiment, the three dimensional image is a image captured from a human or other living organism. Here, the candidate is a medical structure to be searched such as a lung nodule, tumor, etc. The mask is typically a cube shaped mask that is shaped and sized to cover a single nodule (or other structure/object). Rapid detection of such nodules in possible because only the voxels of the foreground image region are tested and not the voxels of the whole image. Further, the determination of intersections is a computationally less intensive procedure as compared to testing the surface properties of all voxels in the image.

BRIEF DESCRIPTION OF DRAWINGS

Preferred embodiments of the invention are described with reference to the accompanying drawings, of which.

DETAILED DESCRIPTION OF THE PREFERRED EMBODIMENTS

The preferred embodiments of the present invention will be described with reference to the appended drawings.

Figure 1:
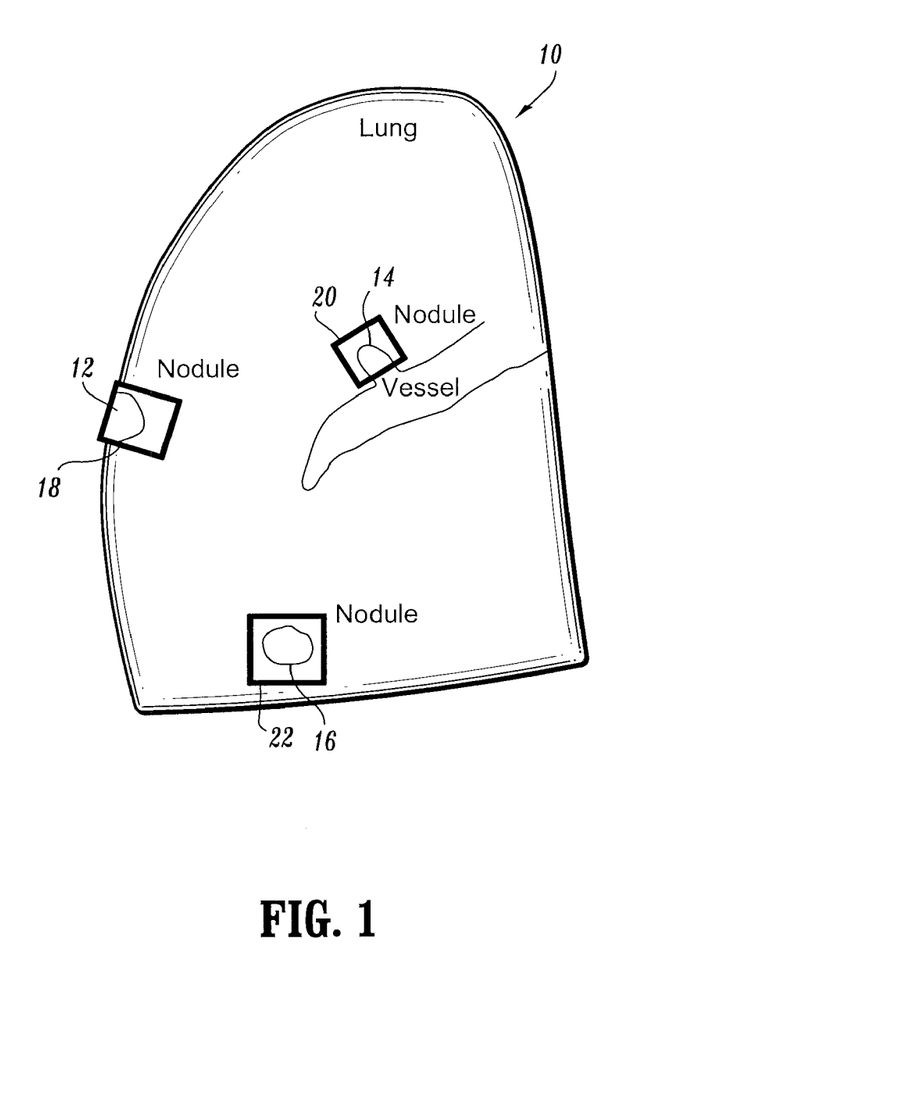
FIG. 1 is an illustrative diagram showing lung nodules with exemplary masks.

FIG. 1 is an illustrative diagram showing lung nodules with exemplary masks. At least one embodiment of the present invention can be utilized to detect solid pulmonary nodules. However, the those skilled in the art will realize that the pulmonary nodules are only used as a typical example to illustrate, and any structure with a known geometry in a volumetric image can be detected. For example, tumors, cysts, etc., can be detected. Further, although the appended drawings are in two dimensions for clarity in illustration, the embodiments of the present invention operate on three-dimensional images.

A typical image captured by a medical imaging device is a volumetric image. The cross-section 10 of an exemplary volumetric image is a part of a lung scan. Three illustrative nodules 12, 14 and 16 are shown along with corresponding masks 18-22. The input image from which the cross-section 10 is taken is typically a segmented volumetric image, which can be classified into two regions. The first is the region of interest (foreground) and the other is a region of non-interest (background).

The input image is described next. All background regions image elements have an unique value. Foreground region image elements can have a common value, in which case the volume is called a "Binary Volume". However, each region or structure in a foreground region has a unique value, in which case the volume is called a "label" or a "labeled volume". Further processing of the image is described next.

The input image is transformed into an image where each voxel is marked either foreground or background. This image is then used as an input for further image processing. All pixels in the image belonging to the background are set with a value 0 and all the foreground pixels are set to a non-zero value to distinguish between the foreground and background regions of the image.

Nodules are located by processing the image. A mask or a reference figure of a specific size and orientation is selected to determine the presence of a desired geometrical property. Here, in at least one embodiment, the present illustration of a pulmonary nodule is used. Hence, a reference figure or a mask in the shape of a bounding box is used. Other shapes of the mask can be also used and another illustration will be described below. Those skilled in the art will appreciate that the bounding box is as an illustrative example of a mask suitable for the geometrical shape of a pulmonary nodule.

In the two dimensional space the mask is a small region where all surface points are set to 1 and all other non-surface points are set to 0. In the 3-dimensions the mask is a small volume where all surface points are set to 1 and all other non-surface points are set to 0. The mask is then moved across the entire image. The center point of the mask is placed on each pixel belonging to the foreground. The number of pixels of the mask intersecting the foreground points are counted. Thereafter, a determination is made as to how many edges (faces in 3-D) of the nodule in the image intersect the reference mask.

The determination of intersections can be performed in multiple ways. For example, specific pixels of the mask (with a non-zero value) overlaid on the input image are compared to the corresponding pixel in the input image when the mask is overlaid over an input image portion that defines foreground image. Intersections can hence be determined as being present when any of the non-zero value pixels of the mask corresponds to a non-zero value pixel in the input image after the process of overlaying and moving the mask over the input image is performed.

In the present example, the illustrative nodules are considered to be either solitary or attached to a vessel or a wall in the lungs. Hence, no intersections would occur for solitary nodules. For example, nodule 16 is a solitary nodule and is fully contained within the mask 22 and hence there is no intersection. On the contrary certain nodules may be attached to a vessel or wall and hence have only one intersection. If however, the criteria of none or only one intersection is not fulfilled then the steps of mask overlaying are repeated for different sizes and orientations. The result of the above nodule finding process creates a list of potential nodule regions.

In another approach this technique can be used to reduce the number of candidates generated by a different algorithm. A segmented volumetric image and a list of locations previously found is processed together. Masks are now directly placed over the locations found previously. The list of locations is pruned if necessary after the intersections are determined. The above described process, which is similar in operation for either a three dimensional image is being searched or a list of previously found locations is being searched, is illustrated in detail below.

Figure 2:
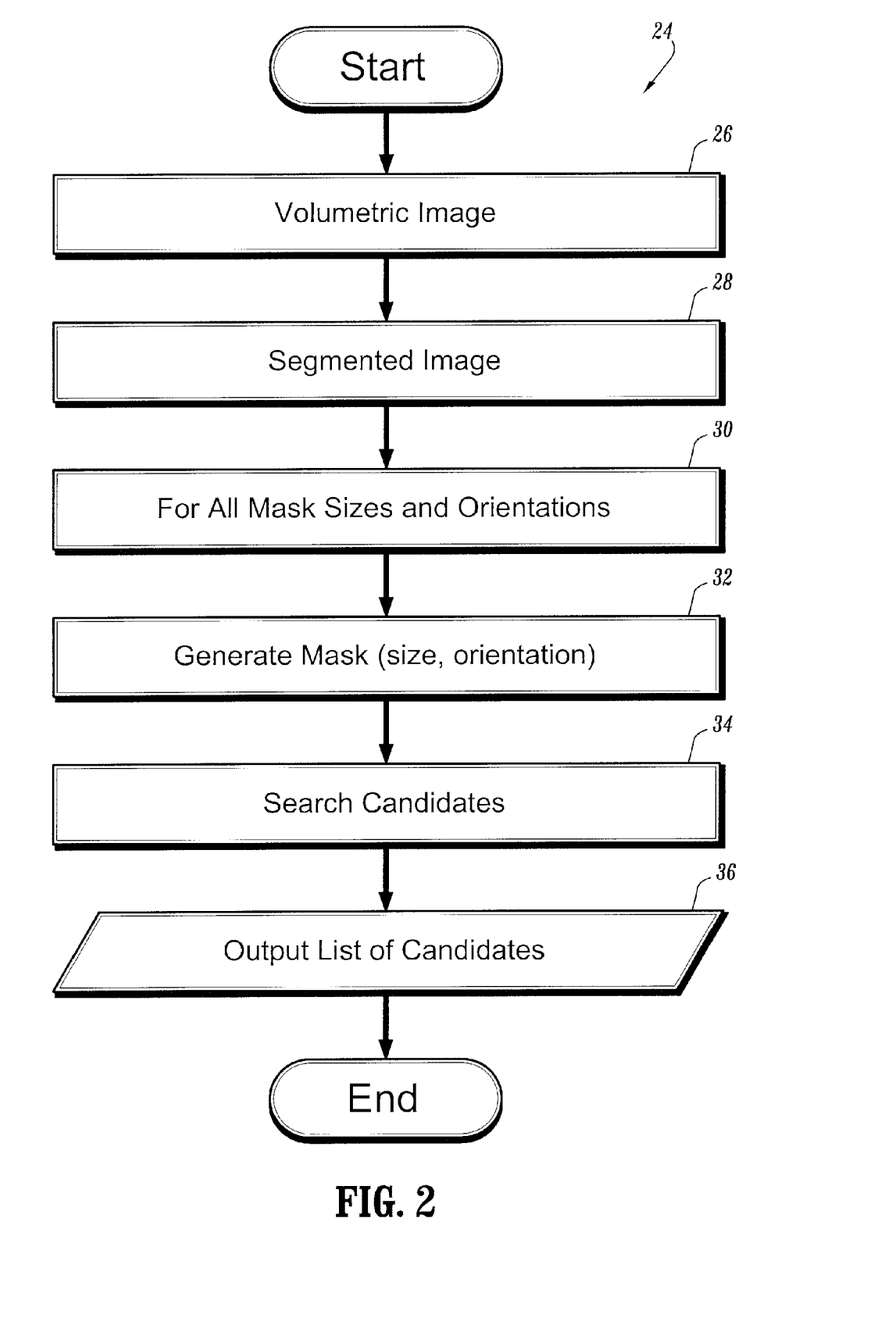
FIG. 2 is a flowchart showing the steps of image processing for candidate generation.

FIG. 2 is a flowchart showing the steps of image processing for structure/object detection. Flowchart 24 shows the steps starting with step 26 where the volumetric image is sourced from an imaging device. The volumetric image is converted into a segmented image at step 28. Thereafter, masks of all sizes and orientations are generated at steps 30 and 32. Masks of multiples sizes and orientations can be used to detect different nodules and other structures/objects in images. Candidates for nodules (or other structures/objects) are searched within images using the masks at step 34. Thereafter, at step 36, a list of candidates is outputted.

Figure 3:
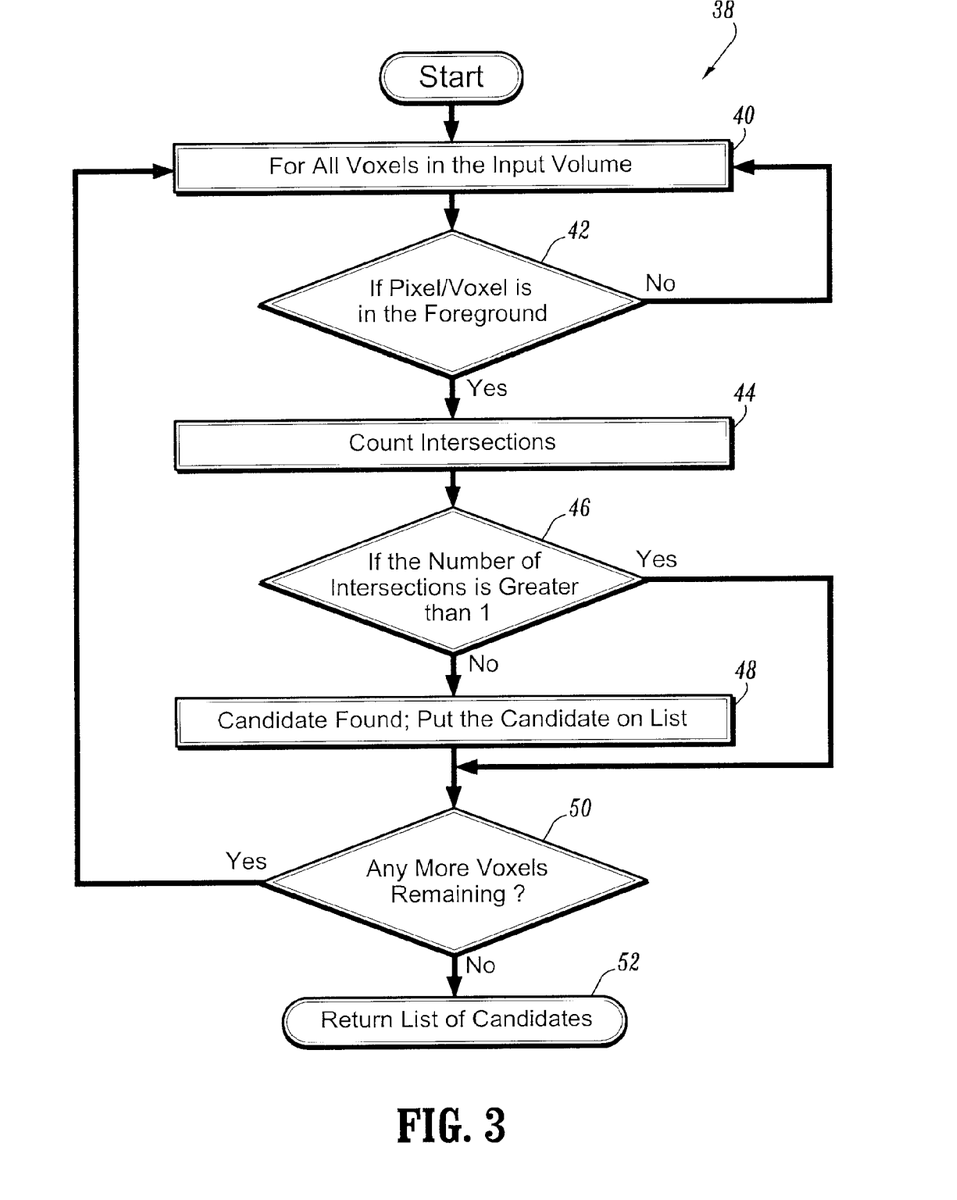
FIG. 3 is a flowchart showing the processing of images including intersections.

FIG. 3 is a flowchart showing the processing of images including intersections. Flowchart 38 starts with step 40 where an iterative process is initiated till all voxels in the input image volume are processed. The image processing is carried out only on the foreground pixels. At step 42 if a pixel or voxel is of the foreground type then intersections are counted at step 44. At step 46 it is determined if intersections are more than one or less than one (i.e., zero or one).

Zero intersection indicates that the nodule or structure/object is completely bounded by the mask, while one intersection indicates that the nodule or structure/object is attached to a wall or a vessel. For cases where intersections are more than one, the iterative process is repeated for other voxels as the branching to step 50 indicates. The process iterates at step 50 back to step 40 till all voxels in the input are processed. If all voxels are processed then a list of candidates for nodules or structures/objects is returned at step 52.

Figure 4:
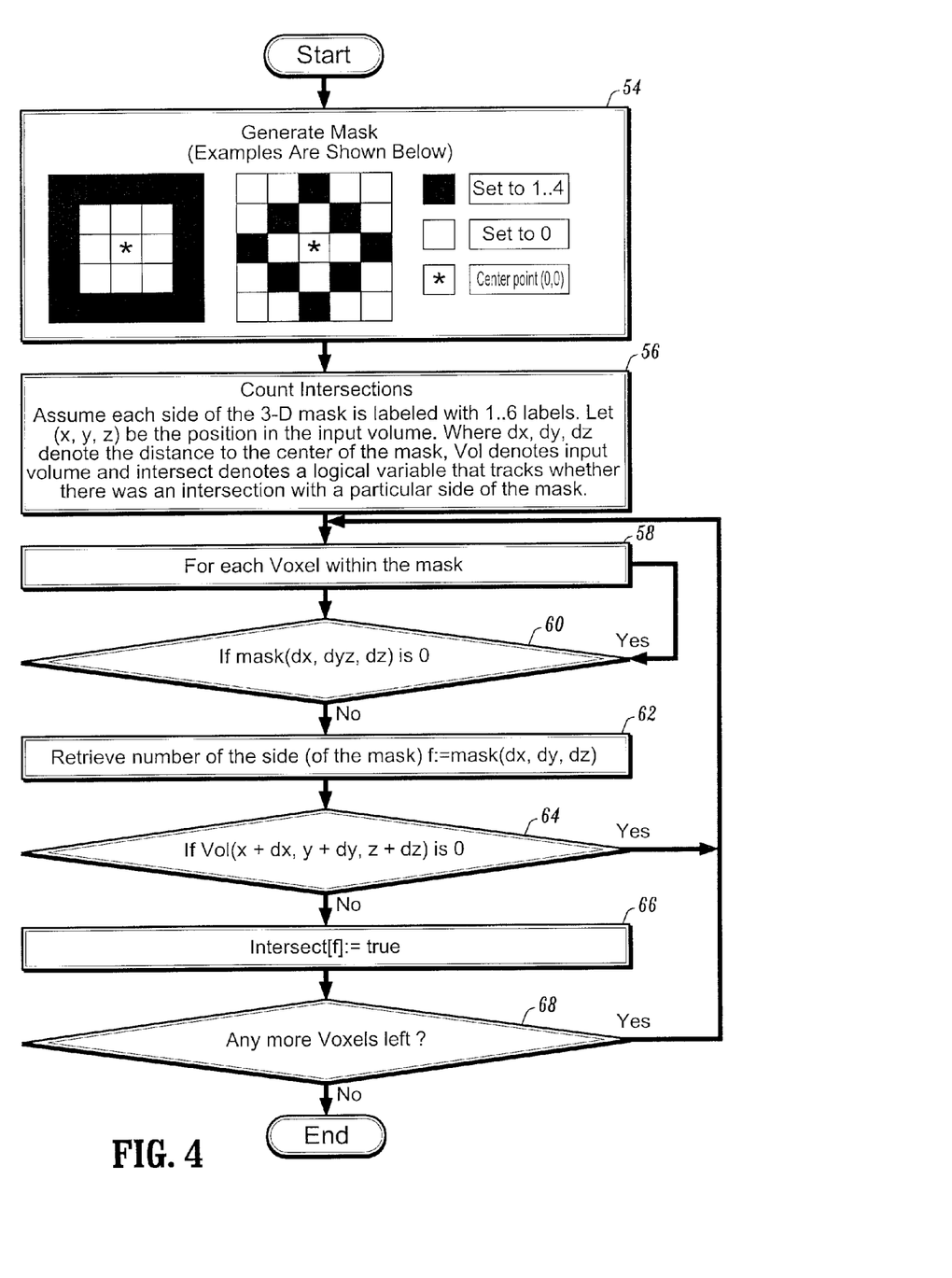
FIG. 4 is a flowchart illustrating the intersection detection process.

FIG. 4 is a flowchart illustrating the intersection detection process. Masks are generated at step 54. Two exemplary masks are shown at step 54. The masks have a grid like structure (when observed in two dimensions) where certain pixels have a zero value and certain pixels have a non-zero value to form a mask. At step 56, the 3-D nature of the mask has been explained. A 3-D mask will have 6 sides forming its 6 faces. The variables dx, dy and dz indicate the distance between the mask point and the center of the mask.

An iterative process is used to process each voxel of the mask. If the mask function, mask (dx, dy, dz) is not 0 then retrieval of the side (of mask) is performed at step 62. At step 64, if the value of the corresponding voxel in the image vol(x+dx, y+dy, z+dz) is 0 then the process is iterated to process the next voxel. However, if the value of the corresponding voxel in the image vol(x+dx, y+dy, z+dz) is non-zero then the intersect[f] is set to true at step 66. If any more voxels of the mask are left to be processed then the iteration repeats itself to start again from step 58.

The speed of recognizing nodules or other structures/ objects can be enhanced because the above technique counts only the intersections with the faces of the box only. Voxels within the box do not have to be considered. For each box (with fixed size and rotation) only the coordinates of the faces have to be computed once. During the detection step the voxel positions are compared to these coordinates.

Figure 5A:
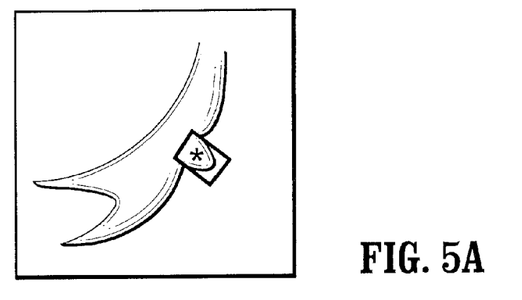
FIG. 5A illustrates a diamond shaped mask.
Figure 5B:
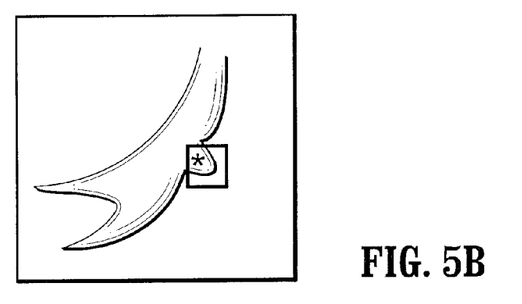
FIG. 5B illustrates a square shaped mask.
Figure 5C:
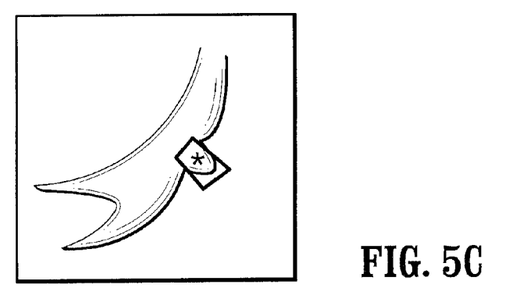
FIG. 5C illustrates a diamond (parallelogram) shape mask of a small size.
Figure 5D:
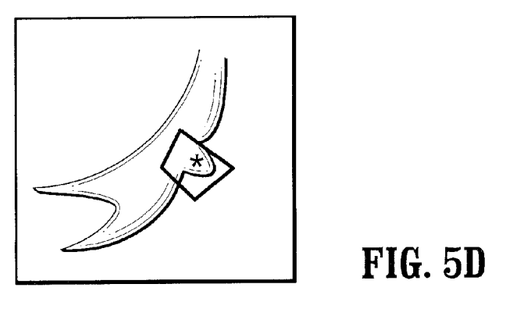
FIG. 5D illustrates a diamond (parallelogram) shaped mask of a larger size.

FIGS. 5A-5D illustrate different types of masks. FIG. 5A illustrates a diamond (parallelogram) shaped mask; FIG. 5B illustrates a square shaped mask; FIG. 5C illustrates a diamond (parallelogram) shape mask of a small size; and FIG. 5D illustrates a diamond shaped mask of a larger size. Masks can vary as to size or orientation. In the below description a two dimensional face of a mask is considered for illustration, however, the mask itself is a three dimensional mask with multiple faces as described above.

First, variations in the orientation of masks are considered. Two exemplary orientations in the form of a diamond shaped parallelogram and a regular square are considered. The diamond shaped mask (FIG. 5A) intersects the nodule (indicated with a * to highlight the same) at only one place and rest of the nodule falls within the mask. However, a square shaped mask (FIG. 5B) intersects the nodule at two places. Hence, the orientation of the mask and the geometrical structure of the nodule will determine the optimal intersection determination.

The size of the mask is another factor that will affect the intersection determination process. FIG. 5C shows a small diamond shaped mask that has only one intersection with the nodule in the image. However, a larger diamond shaped mask has more than one intersection. Hence, selection of an optimal mask size and mask orientation will determine the efficiency of the intersection determination process.

Figure 6:
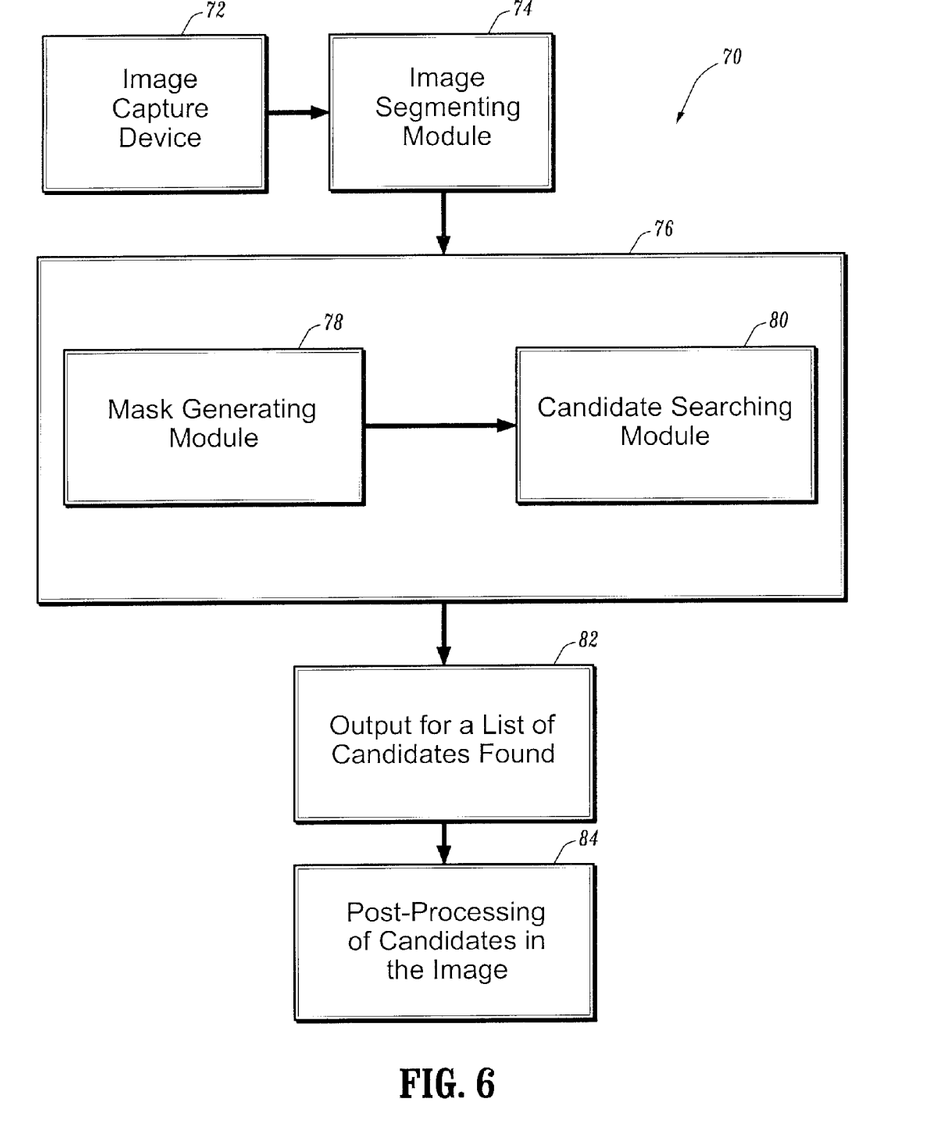
FIG. 6. shows an exemplary system used to find candidates in three dimensional images.

FIG. 6. shows an exemplary system used to find candidates in three dimensional images. In at least one embodiment an image processing system 70 includes an image capture device 72. An image segmenting module 74 generates an image with a separate foreground, which is a region of interest, and a background. The image processing system 70 can be implemented either as an internal embedded device, an external device or as a part of a software architecture. The image processing system can implement either a some or all of the image processing algorithms described above.

An image feature searching system 76 includes a mask generating module 78 that generates masks as described above in detail. A candidate searching module 80 uses the masks generated by the mask generating module 78 to find intersections of the mask and segmented image generated by the image segmenting module 74. Based on the intersections the candidate searching module 80 determines the pixels that match an structure/object to be searched. The list of candidates found is outputted by a output module 82 for further post-processing to module 84. For example, post-processing could involve a thorough analysis of each candidate or displaying the candidate on a display for a doctor to diagnose a medical problem.

FIG. 6 is an exemplary electronic system that can used to implement at least one embodiment of the present invention. It is to be understood that the present invention may be implemented in various forms of hardware, software, firmware, special purpose processors, or a combination thereof. In at least one embodiment, the present invention may be implemented in software as an application program tangibly embodied on a program storage device. The application program may be uploaded to, and executed by, a machine capable of computing and having any suitable architecture.

An illustration of scanned lung images is described next. In a scanned image of lungs, a search for pulmonary nodules in performed. The entire lungs are the foreground region and masks are applied over the lung regions. When a given mask has zero intersections with the nodule image then the nodule is present since it is encompassed within the mask. Even if there is one intersection, the presence of a nodule can be inferred because a nodule may be attached to a wall or vessel.

Rapid searching of candidate images that may be in the form of medical image features (e.g., pulmonary nodules) is made possible by searching only the specific sections of the foreground region. The other alternative of testing every voxel in the image is a time consuming operation, and hence searching only the specific regions is faster. The searching by counting only the intersections improves the speed of searching because the search space is reduced and because calculation of intersections is a relatively fast procedure from a computational aspect.

Figure 7:
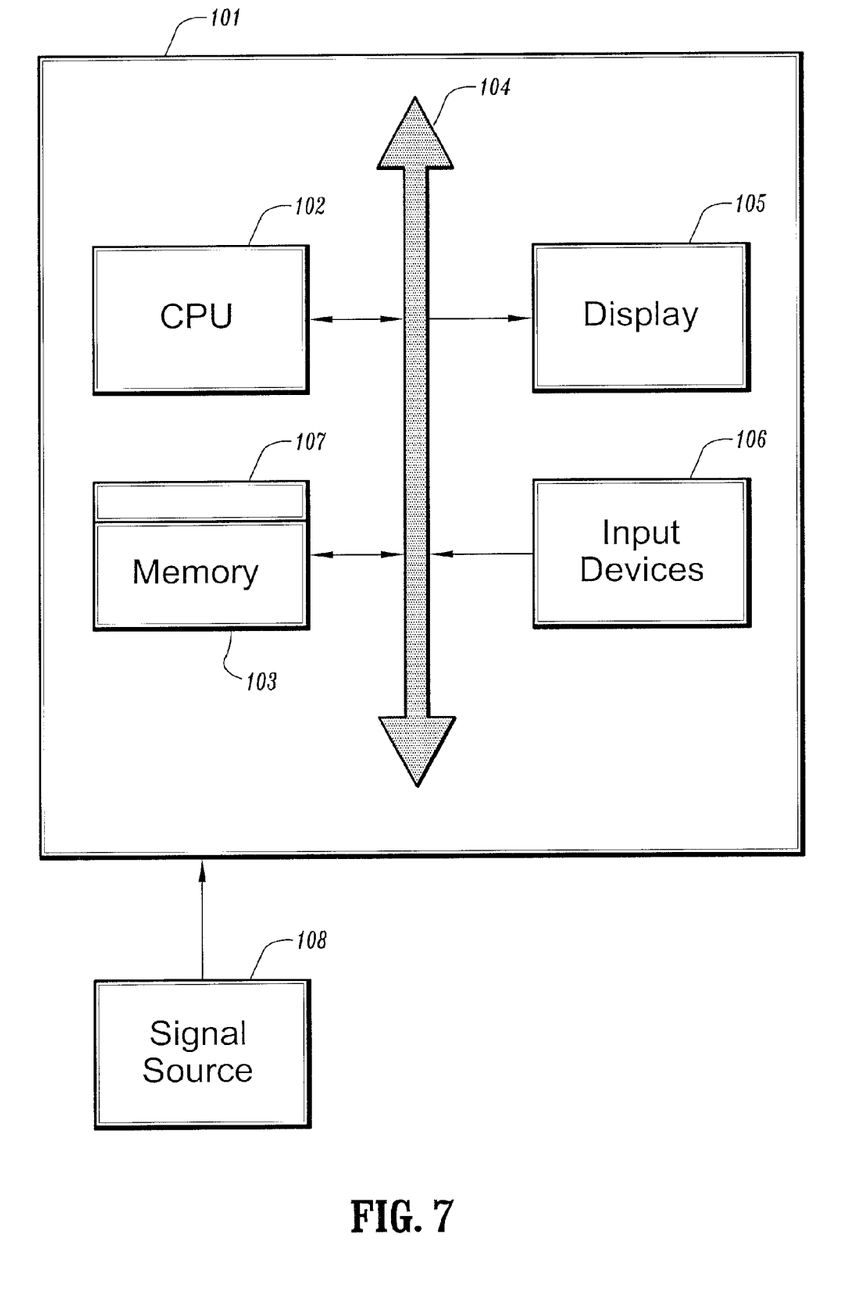
FIG. 7 shows a computer system used to implement an embodiment of the present invention.

Referring to FIG. 7, according to an embodiment of the present invention, a computer system 101 for implementing the present invention can comprise, inter alia, a central processing unit (CPU) 102, a memory 103 and an input/ output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An image processing system for recognizing objects in three dimensional images, the system comprising:
   a mask generator for generating at least one mask, wherein the mask comprises a three dimensional image including a plurality of voxels and having a plurality of faces, wherein at least one of the voxels has a masking value; and a candidate searcher for searching at least one candidate object similar to at least one predetermined object in at least one three dimensional image, the candidate searcher applying the mask to a predetermined region of a foreground image section of the three dimensional image by overlaying the mask on the predetermined region to determine an intersection count between the mask voxels and the predetermined region to search for the candidates.

2. The image processing system of claim 1 further comprising:

an image capturing module for capturing a three dimensional image;

an image segmenting module for segmenting the captured three dimensional image; and an output module to output a list of candidates found by the candidate searcher.

3. The image processing system of claim 1 wherein the image segmenting module separating the three dimensional image into a foreground image and a background image.

4. The image processing system of claim 3 wherein the candidate image searcher operating on said foreground image.

5. The image processing system of claim 1 wherein the three dimensional image is a volumetric image.

6. The image processing system of claim 1 wherein the three dimensional image is a medical image and the predetermined object is a part of a living organism's body.

7. The image processing system of claim 1 wherein the mask having a cubic shape.

8. The image processing system of claim 1 wherein the faces of the mask having a parallelogram shape.

9. The image processing system of claim 1 wherein the candidate searcher determining the presence of at least one candidate when the intersection count being less than two.

10. An image processing system for recognizing presence of medical objects, the system comprising:

an image capture device for capturing a three dimensional image of a part of a living organism;

a image processing system for segmenting the three dimensional image into a foreground image and a background image, the image processing system including a mask generator for generating at least one mask having a three dimensional image including a plurality of voxels and having a plurality of faces, wherein at least one of the voxels has a masking value;

the image processing system applying at least one mask on a selected region of the foreground image by overlaying the mask on the selected region to determine the presence of at least one of the medical objects by counting the intersections between the mask voxels and the selected region.

11. The system of claim 10 further wherein the image processing system determining a positive presence of the medical object if the count of intersections determines the intersections to be numbering less than two.

12. The system of claim 10 wherein the mask has cubic shape.

13. A method of detecting objects in a three dimensional image, the method comprising the steps of:

capturing the three dimensional image using an image capture device; segmenting the three dimensional image into a foreground region and a background region;

generating at least one three dimensional mask; and searching for candidates in the foreground region of the three dimensional image by overlaying the three dimensional mask over a predetermined part of the foreground region of the three dimensional image;

counting the number of intersections between the mask and the predetermined part of the foreground region; and determining the presence of the object that is searched if the intersections are less than two.

14. A program storage device readable by machine, tangibly embodying a program of instructions executable by the machine to perform method steps for searching candidates from a set of objects, the method steps comprising:

generating at least one mask having a three dimensional image including a plurality of voxels and a plurality of faces, wherein at least one of the voxels has a masking value; and searching for candidates similar to a predetermined object in the set of objects in a three dimensional image by overlaying the mask on a predetermined region of the three dimensional image to determine an intersection count between the mask voxels and the predetermined region.

15. The method of claim 14 further comprising the step of:

determining a positive presence of the predetermined object when the count of intersections is less than two.

* * * * *